United States Patent
Myer

[15] 3,663,795
[45] May 16, 1972

[54] ROTOR BALANCER
[72] Inventor: Jon H. Myer, Woodland Hills, Calif.
[73] Assignee: Hughes Aircraft Company, Culver City, Calif.
[22] Filed: Oct. 28, 1968
[21] Appl. No.: 770,983

[52] U.S. Cl. .......................................... 219/121, 331/94.5
[51] Int. Cl. ................................................... B23k 9/00
[58] Field of Search .............. 219/121 L, 121 EB; 331/94.5; 356/23; 178/7.6; 250/199

[56] References Cited

UNITED STATES PATENTS

| | | | |
|---|---|---|---|
| 3,213,281 | 10/1965 | Nedderman | 250/199 |
| 3,257,555 | 6/1966 | Klebba | 219/121 |
| 3,349,174 | 10/1967 | Warschauer | 178/7.6 |
| 3,388,314 | 6/1968 | Gould | 331/94.5 |
| 3,404,254 | 10/1968 | Jones | 219/121 |
| 3,449,542 | 6/1969 | Conner | 219/121 |
| 3,472,998 | 10/1969 | Popick | 219/121 |

Primary Examiner—J. V. Truhe
Assistant Examiner—R. Skudy
Attorney—W. H. MacAllister, Jr. and Allen A. Dicke, Jr.

[57] ABSTRACT

A method and apparatus for dynamically balancing rotary bodies while rotating at operating speed. A laser beam is deflected in a circular path by a moving or nutating mirror or refracted by a wobbling lens which is made to move in synchronism with the rotation of the rotary element such that the beam constantly impinges upon the locus of imbalance of the element until sufficient energy is absorbed from the laser beam to melt and boil-off material from this locus to improve the balance of the rotary element such as a gyroscope rotor.

26 Claims, 13 Drawing Figures

Patented May 16, 1972

INVENTOR.
JON H. MYER,
BY
Joseph P. Kates
ATTORNEY

Patented May 16, 1972

ROTOR BALANCER

BACKGROUND OF THE INVENTION

1. Field of the Invention

This invention relates to a method and apparatus for dynamically balancing rotary bodies or rotors such as gyroscopes. More particularly, this invention relates to a method and apparatus useful for balancing rotors while they are being rotated at their normal, often high, operating speeds.

2. Description of the Prior Art

The purpose of any dynamic balancing method or apparatus for rotating of bodies is to achieve coincidence between the bearing axis and inertial axis of rotation of the rotary body to prevent the generation of unbalanced rotational forces when the element is run at normal operating speeds. Such unbalanced forces generated by a rotor can cause severe stresses on the bearing assemblies. In cases where electrical or inertial sensors are associated with the operation of the rotating body, the presence of such unbalanced forces can cause distortions of such magnitude as to materially limit the performance of devices incorporating the rotary element, and even can totally impair the operation of the devices by causing the ultimate destruction of the rotating component due to structural failure.

The dynamic balancing of rotary bodies, such as gyroscope rotors, is presently accomplished in a series of repetitive steps wherein the rotor being balanced is rotated at its normal operating speed; while in rotation the point of imbalance is sensed and indexed on the rotor; the rotor is then brought to rest; and a small portion of the material forming the rotor at the indexed imbalance point is removed. In order to obtain the desired degree of balance it is normally required that the above steps be repeated about 4 or 5 times. This repetitious procedure of bringing the rotor up to speed or "revving up" the rotor, sensing and indexing the points of imbalance, bringing the rotor to rest, and removing material from the rotor is tedious, time consuming, and materially limits the productivity of conventional balancing machines and the production of precision rotary elements.

Another method that has been utilized is the placement of small lead shot or pellets in a compartment of the rotor and obtaining adjustment by adding or removing quantities of pellets as determined by the above-described presently employed process.

Another known means of dynamic balancing is that of U.S. Pat. No. 2,346,975 wherein an arcing electrode in response to a piezoelectric crystal indication of imbalance removes mass. However, such an arc is of long duration and will smear out a considerable portion of the periphery of the device to be balanced.

In another means, that of U.S. Pat. No. 2,449,563, duration of balancing forces and balance couples are considered in response to variation of the shape, size and orientation of a luminous curve which exhibits prevailing imbalance conditions on a cathode ray oscilloscope. The means of this patent is not suitable since it does not provide the advantages afforded by the invention of synchronization of revolving of the removing tool with the work to enable precision, ease, speed and control of operation.

With the advent of smaller, rugged gyroscopes, which are critically required in manufacture such as of stable platforms and other navigational aids, the disadvantages of presently available balancing processes have become a serious production bottleneck.

In an effort to speed up the balancing process, attempts have been made to utilize a stationary electrical discharge or pulsed laser beam to boil material from the spinning rotor of such gyros. However, due to the very high rate of rotation of the rotor the required pulse duration is extremely short, and in the order of a microsecond. Such short pulses are unable to deliver sufficient energy to obtain the necessary boil-off. When longer pulses were used in the prior art the energy applied was not sufficiently localized and resulted in a smearing out of the beam energy over part of the circumference of the rotors, sometimes to such an extent that there was insufficient concentration of energy to effect boil-off and/or balancing. When "Q" spoiled lasers are used the problem of excessive pulse duration is solved at the expense of great apparatus complexity and the fact that the total energy content of a "Q" spoiled laser pulse is insufficient to remove the quantities of material necessary to obtain balance.

SUMMARY OF THE INVENTION

The present invention is directed to a method and apparatus for dynamic balancing of an unbalanced rotating body while rotating at normal operating speed by utilizing a continuous or intermittent laser beam. The beam is reflected into a rotating circular path by a rotating optical means such as a mirror (or refracted by a rotating lens) to impinge upon surface projection of heavy points which cause rotor imbalance until the imbalances are removed by material being melted and boiled-off from the surface of the rotor. The imbalance is first sensed and the rotor oriented to have a surface of the rotor heavier half facing the mirror or lens and the projection of the heavier portion upon the rotor surface may be marked or otherwise indicated. The rotor and reflecting mirror or deflecting lens are brought into in phase relationship and are synchronously rotated so that the point where the beam impinges on the rotor remains in an approximately fixed relationship during rotation of the rotor. In the described embodiments a phase shifting control may be provided in the rotor and beam deflector (mirror or lens) drive system to enable an operator to adjust the relative rotational phase of the rotor and beam deflector and thereby adjust the point of impingement of the beam on the rotor to coincide with points of rotor imbalance. The points of imbalance are sensed at a particular angular position in the rotation of the rotor. Sensing may be effected, for example, by a standard acceleration sensitive transducer. The transducer responsively actuates a stroboscopic light to illuminate an indicating disc associated with the revolving mirror or lens to determine and provide the degree of phase shift required to obtain coincidence between the point of impingement of the reflected laser beam and the angular location of rotor imbalance being sensed. Circuit means which may be actuated by the output of the transducers may be provided to cut off the laser beam when sufficient material has been boiled-off from the rotor to remove the imbalance.

The previously enumerated disadvantages and limitations encountered in attempts in the art to utilize a stationary laser beam to dynamically balance a rotor while spinning at a high rate of speed have been overcome in the present invention by rotationally deflecting the laser beam in a circular path synchronously with the rotating rotor. This arrangement permits the beam to continuously play on the imbalance point until sufficient energy has been delivered to effect melting and boil-off of the imbalance.

Accordingly, it is an object of the present invention to provide a new and improved method and apparatus for dynamically balancing a rotating body while in rotation at operational speeds.

It is another object of the present invention to provide means whereby a laser beam will impinge upon a point of imbalance of a body in rotation to remove material until dynamic balance of the body is effected.

Still a further object of the present invention is the provision of means whereby portions of a rotating body can be melted and boiled away from the body while it is in continuous rotation to obtain a dynamic balance of the body.

Still another object of the invention is the provision of means whereby a laser beam is deflected in a synchronously rotating path with, while either intermittently or continuously operating and is substantially continuously disposed to focus on, a fixed surface point of the body, for example the surface area projection of an internal imbalance portion, while the body is in a path of rotation, to boil-off imbalancing portions of the body until the body has been dynamically balanced.

These and other objects and advantages of this invention will become apparent from the following description taken in accordance with the specification and considered in conjunction with the accompanying drawings throughout which like reference characters indicate like parts and in which:

DESCRIPTION OF THE DRAWINGS

in FIG. 8 impinging of the beam on a random point which is not causing imbalance on the rotor when the rotor and deflecting mirror are not in imbalance removing phase relationship; in FIG. 9 impinging of the beam upon the surface point of imbalance of the rotor when the synchronizing marker is illuminated by the strobe; in FIG. 10 that when fixed angular relationship and synchronization are established between the mirror and rotor, the laser energy beam continues to impinge upon the point of imbalance when the strobe light is removed; in FIG. 11 that when the laser beam is locked in, impingement of the laser beam on the point of imbalance with the strobe light off is enabled as shown at top dead center; in FIG. 12 when the laser beam is locked in, impingement of the laser beam on the point of imbalance with the strobe light off is enabled as shown at bottom dead center.

It should be understood that in the embodiments of the figs. the beam energy from the laser beam source can be unfocused or can be focused by means of suitable reflecting or refracting elements in the apparatus. Where the beam energy from the source is unfocused, focusing or concentration of the beam should be provided. For example, a focusing lens can be provided in the beam path from the source to the beam deflecting device or the beam deflecting device may be made concave or otherwise shaped or constructed to effect focusing or concentration of the beam upon the rotor surface area of imbalance.

In the invention a rotating element or body such as a gyroscope rotor is positioned so that the heavier portion end face is facing a scanner head, the scanner head is adjusted to deflect a coherent light beam at a distance from the rotor center equal to the distance of the locus of a facing rotor surface point representing rotor unbalance and the rotor is dynamically balanced while spinning, by sensing the passing of the point of imbalance by a transducer, transmitting a beam of laser energy to the scanner head, adjusting the phase relationship between the scanner head and the rotor, to cause the scanner head to reflect or deflect the laser beam in a path which changes direction in synchronism with the rotor rotation such that the laser beam is retransmitted from the scanner head to impinge upon the equivalent point of imbalance, and firing the beam continuously or intermittently with the rotor rotating and the scanner head changing beam direction in phase and in synchronism with the rotor rotation such that the beam continues to impinge upon the surface representation point of imbalance until the material causing imbalance is removed.

The point on the rotor which when removed will help to provide a rotor balanced condition and to which the laser beam is directed to boil off or remove material in the embodiments hereinbelow described and illustrated is herein defined as the equivalent point or area of imbalance.

Figure 1:
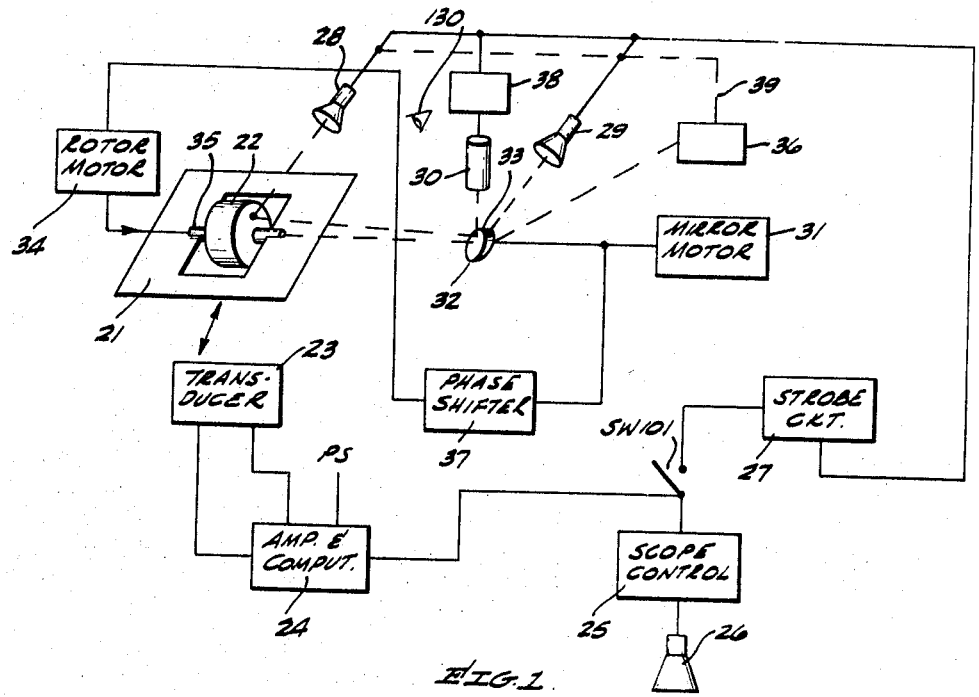
FIG. 1 is a diagrammatic and partially block and schematic representation of a first preferred embodiment of the present invention illustrating a motor driven rotor and an axially aligned, angularly disposed, rotatably motor driven mirror to reflect a laser beam on a rotor surface portion, the removal of which will alleviate rotor imbalance, and further illustrating apparatus and circuits coupled to the rotor and mirror to provide sensing of imbalance and responsive strobing and to enable motor phase adjustment.

Refer to FIG. 1. A platform 21 and a rotor 22 supported by a shaft 35 rotatably mounted in the platform 21 are provided. This embodiment may also comprise a sensing device or transducer 23, an amplifier and computing network 24, oscilloscope control circuits 25, an oscilloscope 26, stroboscopic circuits 27 and rotor strobe light 28. Such devices and circuits are conventional and available for example in a machine described in the "Technical Manual for Model K Dynamic Balancer," Micro Balancing Inc., Garden City Park, N.Y.

A source of laser beam emission 30, wobble mirror 32 and a mirror strobe 29 are also provided. Mirror strobe 29 may be identical to rotor strobe 28. Source 30 may be a laser system, for example of the type obtainable from the Hughes Aircraft Company, Electron Dynamics Division, 3100 West Lomita Boulevard, Torrance, Cal., 90509 and designated the 5500H Laser Microwelder. A mirror marker 33 may be provided on the mirror 32 periphery. In the FIG. 1 embodiment the reflecting surface of mirror 32 is at the front for accuracy. This is preferable to avoid double reflection. Mirror 32 is made concave to focus or concentrate the deflected beam upon the equivalent point of imbalance of rotor 22. Alternatively without departing from the scope of the invention, separate focusing means such as a lens may be provided in the beam path from the source 30 to the imbalance point on the rotor to concentrate or focus the laser beam upon the point of imbalance. The sensing device or transducer 23 is mounted by means known to the art, for example, as in the case of the Dynamic Balancer identified in the next previous paragraph, to sense imbalance of the rotor 22 and pick a signal off in accordance with a heavier surface portion being presented to transducer 23 at the appropriate instant upon each revolution of the rotor 22. The double arrow in FIG. 1 between the platform 21 and the transducer 23 indicates motion. The amplifier and computer network 24 is connected in circuit to be responsive to transducer 23. The oscilloscope control and strobe circuits 25 are connected in circuit to be responsive to amplifier and computing network 24. The oscilloscope 26 is connected to and controlled by the output of the oscilloscope control circuit 25. The rotor strobe 28 and mirror strobe 29 are connected in parallel to be responsive to the output of strobe circuit 27. Responsive to the transducer 23 signal output, the amplifier and computing network 24 causes a presentation via oscilloscope control circuits 25 to enable the signal to be observed upon the face of the oscilloscope 26. The sensing of the imbalance of the rotor 22 by transducer 23 is also conveyed via strobe circuit 27 to cause the rotor strobe 28 to flash each time that the transducer 23 picks up a signal from the rotating rotor 22 showing imbalance. Since the rotor strobe 28 and the mirror strobe 29 are connected in parallel, the mirror strobe 29 also pulses each time the point of imbalance (not numbered) on rotor 22 passes the transducer 23. A rotor motor 34 and a mirror motor 31 are also provided and may be mechanically connected to rotor 22 and mirror 32 respectively to render them rotatable. A phase shifter circuit 37 may be provided and may be connected between the mirror motor 31 and the rotor motor 34 to permit adjustment of the angular relationship of the motors 31 and 34 relative to each other.

Figure 6:
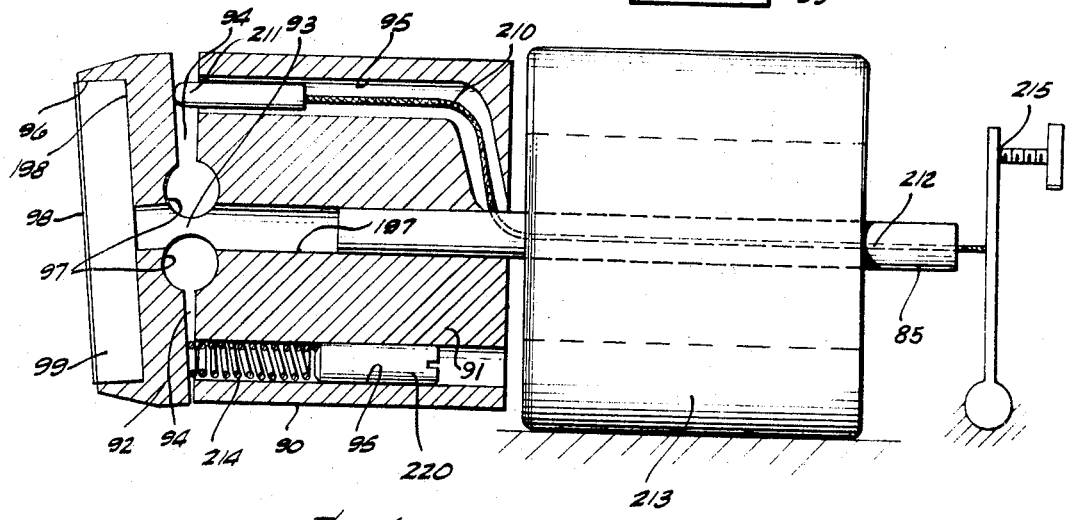
FIG. 6 is a cross-sectional view of a practical embodiment of a wobble mirror holding element alternatively usable to hold the mirror of FIGS. 1, 2, 5 or 8–13, for example the wobble mirror holder being generally cylindrical and comprising a mirror holding cup section and a motor shaft holding substantially solid section separated by a transverse circular portion comprising a flexible thin joining strip and a slot, this fig. further illustrating the mirror deflection angle adjusting means and the mounting thereof and of the mirror holder in the mirror motor.

The mirror 32 may be supported by conventional means such as being mounted upon the end of output shaft (not shown) of mirror motor 31 in which case this shaft of the mirror motor will be angularly adjustable with respect to the axis of rotor 22 or may be supported in a device such as that shown in FIG. 6 to be described which in turn may be mounted upon the output shaft of the mirror motor 31. Whenever such a device is utilized and mirror 32 is secured around its periphery, the mirror marker 33 may be marked upon the periphery of such a holder in position to be flashed upon by strobe 29.

The mirror 32 and shaft 35, and hence the rotor 22 are situated on a common axis. It should be understood that the rotor may not be of the type mounted or mountable upon a shaft such as shaft 35 and in such case it is contemplated and within the scope of the invention to provide other conventional appropriate mounting means such that the rotor and mirror 32 are axially centrally aligned. Adjustment means 36 to adjust the angle of the reflection face (not numbered) of mirror 32 with respect to the target face (not numbered) of rotor 22 is provided. Adjustment means 36 may be any one of various conventional means for adjusting the mirror angle for example the means shown in FIG. 6 to be described. The holder of mirror 32 may be mechanically linked to strobes 28 and 29 by linking means 39 which may be provided so that the strobes 28 and 29 are held in respective alignment with mirror marker 33 and the rotor face. In operation the mirror 32 is adjusted or set at an angle with respect to the axially aligned mirror and rotor supporting shafts by adjustment means 36 to aim an incoming beam of energy at a suitable radial distance to impinge on the equivalent point of imbalance on the rotor 22. When thus adjusted, incoming laser energy may be caused to be emitted from source 30. This energy is deflected by the rotating mirror 32 onto the face of rotor 22 in a circle concentric with the axis of rotor 22 at the radially disposed distance equal to the distance from the center of the point of imbalance upon the face of the rotor 22. If desired means (not shown) may be provided to supply a light beam rather than a laser beam during the period of adjustment.

The marker 33 is positioned such that when it is illuminated by the mirror strobe 29, the point of imbalance of the rotor 22 face is opposite and aligned such that the laser beam deflected from mirror 32 strikes the point of imbalance. In adjusting for this relationship compensation may be provided for any delay between sensing of the signal and responsive flashing of the strobe 29.

Thus, upon an operator switching on the apparatus, the point of imbalance of rotor 22 is sensed by the sensing device or transducer 23. Amplifying and computing circuit 24 responsive to the output signal from transducer 23, with switch SW 101 in closed position actuates the strobe circuit 27. Responsive to this actuation, strobe circuit 27 causes the rotor strobe 28 and the mirror strobe 29 to flash in synchronism with the sensed imbalance point each time it passes transducer 23. It will be understood of course that means to adjust amplification of amplifier and computing network 24 may be provided so that only the maximum point of imbalance will actuate the strobes 28 and 29. By adjustment of the phase shifter 37, the operator changes the phase relationship between the rotor motor 34 and mirror motor 31 to synchronize the rotation of the rotating rotor 22 and the rotating mirror 32. This is accomplished when the marker 33 on the rotating mirror 32 is illuminated by the mirror strobe 29 once each revolution of the rotor 22 at the same instant as the point of imbalance is located under the point of impact of the energy beam. As the rotor 22 rotates and as the strobe pulses from mirror strobe 29 and rotor strobe 28 occur, the mirror strobe 28 will ordinarily not initially hit the mirror marker 33 since originally ordinarily the rotor drive motor 34 and the mirror drive motor 31 are rotating out of synchronism with flashes from the mirror strobe 29. In order to get the mirror marker 33 properly aligned, such that flashes from the mirror strobe 29 hit the mirror marker 33 for each revolution, the phase relationship between the mirror 32 rotation and the rotor 22 rotation is shifted such that the rotor 22 is made to rotate at the same speed as and in phase with the rotation of the mirror 32. When this phase and speed synchronization is achieved, the mirror marker 33 is illuminated by the mirror strobe 29 once for each revolution of the mirror 32. Thus since the mirror strobe 29 lights each time the point of imbalance is opposite and in the same plane of rotation and the mirror angle is adjusted to deflect in a circle, the radius of which is the distance from the rotor axis of the point of imbalance, the laser from laser energy source 30 may be fired at this instant and the beam of laser energy will strike the mirror 32 face and be reflected (or deflected) continuously while being fired onto the unbalanced point at the face of the rotor 22.

It will be understood that the position of the mirror marker 33 may be determined by optical alignment during the manufacture of the mirror holder (not shown in FIG. 1). In manufacturing the apparatus, the strobe light 28 and 29 may be positioned to automatically flash each time the unbalance of a rotor such as rotor 22 is picked up by the transducer 23. The mirror marker 33 is positioned arbitrarily such that a given mirror 32 may be selected and positioned at an arbitrary angle, and the marker 33 may be placed by calibrating, for example, with an ordinary light source. The marker 33 is positioned where a light or laser ray will be deflected down and then straight backwards towards the strobe 29, that is, at the point of maximum deflection, such that the strobe ray points in the same angular relationship or rotational plane as the marker 33.

At the beginning of operation of the machine, there is no particular phase relationship between the rotor point of imbalance and the point on the rotor 22 whereupon rays from source 30 are deflected by mirror 32. As the unbalance point is sensed by the transducer 23 which causes the rotor strobe lamp 28 to fire, the mirror strobe lamp 29 is also caused to fire. However, ordinarily the marker 33 upon the periphery of the mirror 32 is not directly opposite the mirror strobe 29. By means of the phase shifter 37 the rotor drive motor 34 may be speeded up, or slowed down, until the rotor drive motor 34 speed is in synchronism with the speed of the mirror motor 31 and until the phase relationship is such that the point of impingement upon the face of rotor 22 of the beam deflected by the mirror 32 is exactly in phase with the point of unbalance. The rays from the laser source 30 then impinge upon the point of imbalance on the face of the rotor 22.

After the above adjustments are made, and just before the laser source 30 is fired, the following condition exists: The angular point to which a mirror 32 aims the laser beam reflected from source 30 and from the face of the mirror 32, that it the position of angular deflection of the mirror 32 and the rotational position of the mirror marker 33 are such as to provide in-phase rotation of the mirror 32 with the point of imbalance on the rotor 22 such that responsive to the point of imbalance passing the sensor 23, coincidently the point of imbalance on the rotor 22 and the marker 33 on the mirror 32 are simultaneously illuminated. This indicates that the condition necessary for reflective firing the laser from laser source 30 has been attained.

Under these conditions, it makes no difference whether the source of laser emission 30 illuminates the face of the mirror 32 with a continuous or with a pulsed intermittent laser beam since the energy of the laser beam now continuously impinges upon the point of imbalance during the entire cycles of rotation of the in synchronism and in phase mirror 32 and rotor 22. That is, since the wobble mirror 32 and the rotor 22 are now rotating at the same velocity and are also in phase the laser beam is continuously striking the point of imbalance of the rotor 22. The laser source 30 may be turned on to emit a laser beam either continuously or intermittently. The laser beam should be on for a duration of time until it has removed the imbalance on the face of the rotor by removing or gouging out material at the point of unbalance. The presentation on the oscilloscope 26 provides a test or check of the amplitude of imbalance of the rotor at any time. However, when the termination of imbalance is effected, by the removal of the material which caused the imbalance, by the laser beam, this condition is automatically sensed. When the imbalance is removed since rotation is steady, the rotor is not wobbling and the transducer 23 does not pick up a signal. Without a transducer signal the strobe lights 28 and 29 do not strobe. Switching means 38 may be provided which responsive to cessation of the transducer 23 signal or alternatively to stopping of the strobe lights 28 and 29 cause the laser source 30 to be turned off. Such switching means are conventional and may comprise an electronic gate to supply a current in the absence of a signal, gate current output amplification means, and a solenoid actuated by the amplification means output and connected in circuit to selectively enable and disable source 30.

Summarizing, the operator in employing the apparatus first brings the rotor 22 and rotating mirror 32 up to operating speed. The transducer 23 senses the imbalance of the rotor 22 and causes the rotor strobe 28 and mirror strobe 29 to flash. The phase shifter 37 is then adjusted until the mirror marker 33 is centered to receive the flash from mirror strobe 29. Adjustment of the angle of the mirror 32 with respect to the rotor 22 axis is also made during rotation such that the laser beam when activated removes the imbalance material from the face of rotor 22. The laser source 30 is activated to permit the laser beam to be emitted. The laser beam from source 30 is deflected from the face of wobble mirror 32 and strikes the face of the rotor 22. The process of sensing imbalance and flashing the rotor and mirror strobes, phase shift adjustment, mirror tilting and activating the laser may be repeated or continued until imbalance has been removed.

The operator's eye may be emplaced at a position behind the strobes 28 and 29 and laser source 30.

It is apparent from the above description of FIG. 1 and will be apparent from the remaining figs. to be described that the apparatus and method of the invention are independent of laser pulse duration or timing. Once synchronism and phase locking of rotor and deflector rotation has been attained, the laser beam may be continuously or intermittently pulsed until the point of imbalance has been removed at which time responsive to lack of signal indicating imbalance from the transducer the laser source may be turned off.

Figure 2:
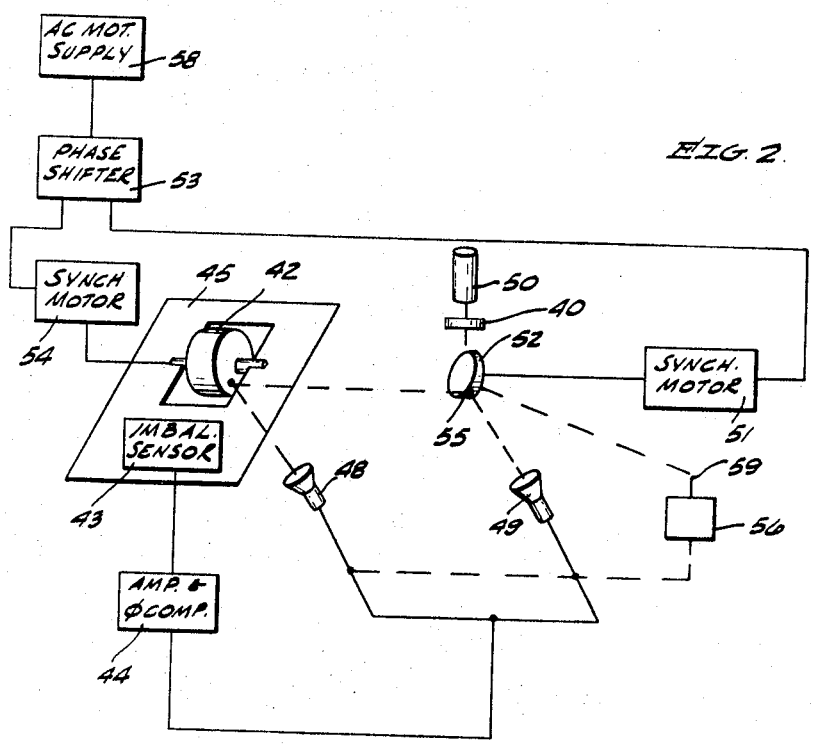
FIG. 2 is a diagrammatic and partially block and schematic representation of a second preferred embodiment of the present invention illustrating a motor driven rotor and an axially aligned, angularly disposed, rotatably motor driven mirror, and transducer, strobe, and phase shifting apparatus and circuits some of which may be similar to those of the FIG. 1 embodiment but incorporating synchronous motor and input voltage phase shifters.

Refer to FIG. 2. A rotor 42 and a wobbling mirror 52 which may be aligned are provided. Wobbling mirror 52 may be secured in a holder (not shown in FIG. 2), for example, the holder of FIG. 6 to be described. To rotationally drive the rotor 42 and the wobbling mirror 52 (or its holder) are provided respective synchronous motors 54 and 51. A synchronous motor is one which is firmly locked into the frequency of the alternating current power supply driving it and rotating at only one rate of rotation which is determined by this frequency. The frequency of the motor drives 54 and 51 and the rotation of the rotor 42 and the wobbling mirror 52 is determined for optimum balance testing by the rotational speed of the vibration tested device in actual use. For example, a gas turbine which runs at 8,000 revolutions per minute will be tested at 8,000 revolutions per minute while a gyroscope which runs at 16,000 revolutions per minute will be tested at 16,000 revolutions per minute.

An ac motor supply 58 is provided. As stated, the rotational speed in revolutions per minute of a synchronous motor is dependent upon (locks in with) the frequency of the ac input. For example, for a one pole-pair motor, a 60 cycle frequency will produce 3,600 revolutions per minute. If 7,200 revolutions per minute are to be provided, 120 cycles AC current must be fed into the machine. Therefore, ac motor supply 58 is selected such that the ac motor 54 will be driven at a speed to cause the rotor 42 to rotate at the speed at which it is operated in use.

It should be understood that the invention is not to be limited by the use of a synchronous or any other special type of motor and many variations are possible within the scope of the invention. For example, alternatively, the rotor 42 may be driven by any type of conventional motor and a synchronizing generator attached to the motor will cause the mirror motor 51 to be driven at the identical rotational speed as the speed of rotation of the rotor 42. Further, alternatively a mechanical light mechanism may be provided such that the rotational speed of the mirror 52 is made equal to the rotational speed of the rotor 42.

A phase shifter 53 may be provided for changing the phase of the input to the synchronous motors 54 and 51 such that the point of imbalance (not numbered) on the face of the rotor 42 is caused to rotate with the mirror deflection point of impingement on the rotor 42 by a beam of deflected energy from the face of the mirror 52 to the face of the rotor 42 as will be described. Thus, the phase shifter 53 (or alternately other means) is provided to cause slaving of the mirror drive mechanism 51 to the rotor drive mechanism 54.

An imbalance sensor 43 may be provided to sense the imbalance of the rotor 42. Sensor 43 generates a signal each time a point of imbalance is sensed for each revolution of the rotor 42. An amplifier and phase compensator network 44 is provided and is connected to receive and be responsive to the imbalance sensor 43 output signal. A rotor strobe unit 48, a mirror strobe unit 49, adjustment means 56 and linkage 59 are provided. Adjustment means 56 may comprise conventional mirror or mirror holder adjustment means to angularly adjust the mirror similar to the means of FIG. 6. Linkage 59 may comprise a mechanical linkage operating together with adjustment means 56 to position strobe unit 48 to strobe the face of the rotor 42 at the selected radial distance outward from the center of the radius of the point of imbalance on the rotor 42 and at the point of reflection of a beam of laser radiant energy which is emitted and deflected from the mirror 52 in a manner to be described. Linkage 59 may also comprise means to position strobe 49 to strobe the periphery of mirror 52 as will be described. A source of laser beam energy 50 is provided. The mirror 52 and source 50 are relatively positioned or positionable such that the emitted laser beam impinges upon the mirror 52 reflective face from which the beam is deflected to impinge upon an opposite target rotor 42 face which is the face of rotor 42 on the heavier rotor side. Responsive to the imbalance signal from imbalance sensor unit 43, the amplifier and phase compensator circuit 44 causes the rotor strobe 48 and the mirror strobe 49 to flash at the correct instant in time coincident with the sensing of imbalance. The frequency of flashing by the mirror and rotor strobes 49 and 48 are thus determined by the imbalance sensor 43. It will be understood, of course, that the wobbling mirror 52 may be held in a holder, of the construction described in FIG. 6, for example, such that the angular off-axis deflection and hence the radius of deflection may be varied by adjusting during rotation to bend the holder axis as will be described in the description of FIG. 6 thereby radially adjusting the point of deflection and that adjustment means 56 may optionally be separate means to adjust the positioning of the mirror 52 and of mirror strobe 49 and rotor strobe 48 or mirror 52, rotor strobe 48 and mirror strobe 49 may be linked by linkage 59 as shown.

A laser beam concentrating or focus means 40 may be provided. Adjustment means 56 provides for adjustment of the radial displacement of the beam impact point so that the locus of the circle of impingement on the face of rotor 52 may be adjusted at the radius of the point of imbalance from the center of rotor 42. Optionally axial displacement or angular displacement of mirror 52, and of strobes 49 and 48 will permit this adjustment of the point of laser beam impingement. In operation, upon rotation of the rotor 42, each time the imbalance heavy point appears opposite the rotor strobe unit 48, the imbalance sensor 43 picks up a corresponding signal and the amplifier and phase compensator 44 cause the rotor strobe 48 and the mirror strobe 49 to flash accordingly at this instant. A mirror marker 55 is provided on the periphery of mirror 52. The mirror marker 55 is placed such that when illuminated by mirror strobe 49 the beam of laser energy from source of laser energy 50 hits the face of mirror 52 and is deflected to hit the rotor face of rotor 42 at the radially outward point from the center at which the point of imbalance occurs.

It is further contemplated and within the scope of the invention that a plurality of mirror markers (not shown) may be disposed around the periphery of the mirror 52 with all markers but a desired marker to be illuminated. This would provide more flexible phase shifting ability. Also the rotor strobe could be dispensed with if it is not desired to have this visual check of coincidence of the point of imbalance with the strobe flash.

Assuming that the mirror marker 55 of wobbling mirror 52 is out of synchronism such that the beam from mirror 52 does not impinge continuously upon the rotor face projection of the point of imbalance of the rotor 42, the phase shifter 53 is adjusted to shift the phase of the input voltage from the AC power supply 58 until the rotation of the synchronous motor 54 and hence of the rotor 42 is exactly in phase with the rotation of the synchronous motor 51 and hence with the rotation of the mirror 52. In this condition and with the rotor 42, the mirror 52 and source 50 in proper alignment, the deflected beam from the wobbling mirror 52 will be trained to strike the point of imbalance of the rotor 42. The mirror strobe from mirror strobe unit 49 in this condition illuminates the marker 55 on each rotation and the rotor strobe unit 48 illuminates the projection on the face of rotor 42 of the point of imbalance upon each rotation of the rotor 42.

When this adjustment has been accomplished, the laser source 50 of the laser beam may be switched on. The firing of the laser beam onto the projection on the opposing face of the rotor 42 of the point of imbalance to gouge out material at that point may be effected either continuously or intermittently. When the flashing of strobes 48 and 49 stops, this indicates that the imbalance has been removed. Flashing or strobing of strobe units 48 and 49 stops when sensor 43 no longer picks up a signal. Without the sensor 43 signal the amplifier and phase compensator 44 no longer actuates the strobe units 48 and 49.

The amplifier and phase compensator 44 comprises electronic means to insure that the rotor strobe unit 48 and the mirror strobe units 49 flash at the correct instant in time. The frequency of strobing is determined by the imbalance sensor 43 which, via the amplifier and phase compensator 44, determine the pulsing of light energy from the rotor strobe unit 48 and the mirror strobe unit 49, respectively onto the point of imbalance 52 of the rotor 42 and onto the mirror marker 55.

There thereby is provided in FIG. 2 a means such that when the mirror marker 55 is illuminated by the mirror strobe 49, flashing, the laser beam from laser source 50 automatically impinges on the location of the projection on the rotor face of the point of imbalance 52. The rotor strobe unit 48 permits monitoring of the balancing action. If such monitoring is not desired, the strobe 48 may be omitted.

While nowise to be limited thereto, the platform 45, ac motor supply 58, synchronous motors 51 and 54, imbalance sensor 43, strobes 48 and 49, and corresponding units of the FIG. 1 embodiment and the oscilloscope 26, oscilloscope control 25, and strobe units 48 and 49 may by of the type described in the above-identified Technical Manual for Dynamic Balancer. The phase shifter 53 and amplifier and phase compensator circuits 44 may be of the conventional types. For example, the amplifier and phase compensator circuit 44 may be electronic means of the type available from the Theta Instrument Corporation, Saddle Brook, N.J. as Model Pg–3, illustrated in Catalog 4–11, 1966, page 21 and in circuit relationship as shown on page 22, center diagram. The laser source 50 may be the above-described unit sold by the Hughes Aircraft Company and designated as the Hughes Aircraft Company Laser Microwelder Model 5500. The lasers provided for the laser sources of the figs. may be pulsed lasers such as ruby, neodymium glass, or any of a large number of gas lasers such as the argon or carbon dioxide lasers sold by the Hughes Aircraft Company, Torrance, Cal. and wherein the lasers utilized are of the type, for example Q-switching types which generate a pulse of sufficient power for boiling off of the imbalance material in a reasonable time.

Figure 3:
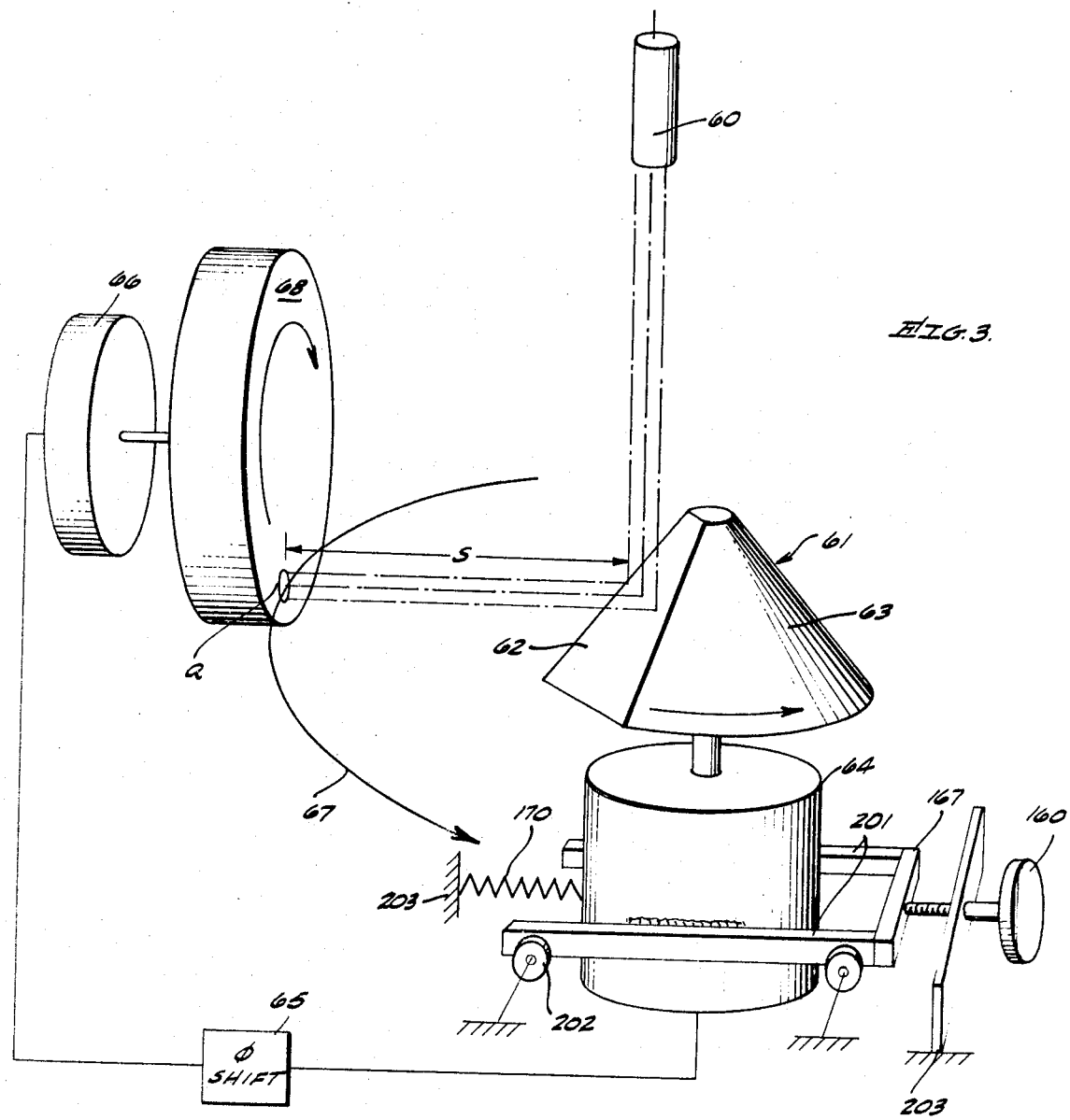
FIG. 3 is a simplified diagrammatic and partially schematic representation illustrating certain of the essential elements of a third preferred embodiment of the present invention and wherein is shown a rotor scanner head comprising a flat mirror mounted on a motor shaft driven frusto-conical support which is made to run in synchronism with the rotation of a rotor to be balanced, and a source of laser beam energy having a path of impingement on the flat mirror, the support being positioned to reflect the beam onto the face of the rotating element.

Refer to FIG. 3. An optical scanner head generally designated 61 is provided. Head 61 may comprise a frustoconical shaped body 63 and a flat mirror 62 attached to body 63. A source 60 of laser beam energy is provided. Source 60 may be identical to that of FIGS. 1 and 2. The laser beam emitting face of source 60 may be disposed in angular relationship with the reflecting face of the flat mirror 62 such that, as illustrated by the dashed ray lines, (not numbered) the laser beam is reflected angularly, for example, substantially perpendicularly to the source 60 beam emitting path. Scanner head 61 may also comprise a fixed speed motor 64 having an output shaft (not numbered) upon which the body 63 is mounted. A rotor 68, which may be a gyroscope rotor and which is to be balanced, is suitably mounted and rotated by rotor driver motor 66 which may be provided. The mirror 62, source 60, and rotor 68 are respectively positioned such that the laser beam reflected from the mirror surface traverses an appropriate path which includes the point of imbalance, the removal of which will cause balancing, on the face, for example, of the rotor 68. While the invention is nowise to be limited thereby, rotor 68 may be of the type used in small gyroscopes which rotate at 10,000 to 20,000 revolutions per minute. To permit adjustment of the radial distance from the rotor 68 center at which the deflected laser beam strikes, adjustment means are provided. For example, illustrated in FIG. 3 is provision of a mirror rotor displacement mechanism having two ways 201, guidewheels 202, a threaded adjustment screw 160 threadedly engaged in threaded nut 167, a spring 170 attached on one side to a fixed support 203 and on the other side to the movable motor 64. Spring 170 serves to eliminate slack in the movement of the motor assembly. The source 60 and rotor 68 may be fixedly supported. Hence rotation of adjustment screw 160 provides adjustment of the height locus of the area at which the beam from the source 60 strikes the flat mirror 62. This governs the radial distance from the center of rotor 68 at which the beam, reflected from the source 60 by the flat mirror 62, impinges upon the rotor 68. It should be understood that many ways of setting the locus of the impingement of the beam on the rotor 68 may be provided and that the means described is only exemplary and nowise limiting on the invention. For example, alternatively the scanner 61 may be provided with means to make it pivotally or angularly adjustable or means to adjust the source 60 laterally or rotationally with respect to the mirror 62 may be provided such that the radial distance of area a where the beam strikes may be coincided with the distance from the center of rotor 68 at which the point of imbalance occurs. Still further alternatively adjustable means may be provided to pivot rotor 68 or move it vertically to cause directing of the beam of laser energy at the radial distance from the center of rotor 68 at which the point of imbalance a lies.

In order for the beam of laser energy to remove an appreciable amount of material from the point of imbalance $a$, the peripheral speed of the point of imbalance a must be the same as the peripheral speed of the point of impact of the reflected beam in travelling in path 67. The distance "S" determines the radial location of the point of impact on rotor 68 and of mirror 62. Phase shift means 65 are provided to adjust the speed of rotor 68 to effect the meshing of the path 67 of lateral chordal travel of the beam projection upon the gyroscope rotor 68 face with the peripheral segmental distance of travel of a point on the periphery of the face of rotor 68 so that the chordal distances travelled per unit of time are equal. For this purpose the rotational speed of the motor 66 which drives rotor 68 is made adjustable to proper meshing speed by phase adjustment means 65.

In operation, the synchronous motor 64 rotates the body 63 mounted upon its output shaft (not numbered) and accordingly also rotates the attached flat mirror 62 around the motor 64 shaft axis. The laser beam from source 60 is reflected from mirror 62 in an expanding circular path of impingement upon the rotor 68, as represented in the vicinity of rotor 68 by an arc trajectory 67. The location of the point of imbalance a may be determined by sensing, circuit and stroboscopic means (not shown), which may, for example, be those illustrated and described in the FIG. 1 and 2 embodiments and the illustration and description of these are not repeated herewith to avoid redundancy. Alternatively, sensing and circuit means may be employed such as that for example illustrated and described in the aforementioned U.S. Pat. No. 2,346,975. The source 60 may emit the laser beam continuously. Alternatively, lamp means (not shown) may be provided until the rotor 68 and mirror scanner 61 are set up for removal of material to commence and source 60 may then be switched on. Adjustment of the reflected beam projection by adjustment screw 160 is made such that the gyroscope rotor 68 which is to be balanced intercepts this reflected beam at point of imbalance in accordance with distance "S." The speed of rotor 68 is adjusted by means (not shown) for normal operating speed and the phase relationship of rotor 68 to motor 64 is adjusted by phase shift means 65 such that the peripheral speed of the rotor 68 and of a point on circular path 67 of the deflected laser beam are meshed to coincide at point of imbalance a for each revolution of rotor 68 and mirror 62.

Figure 4:
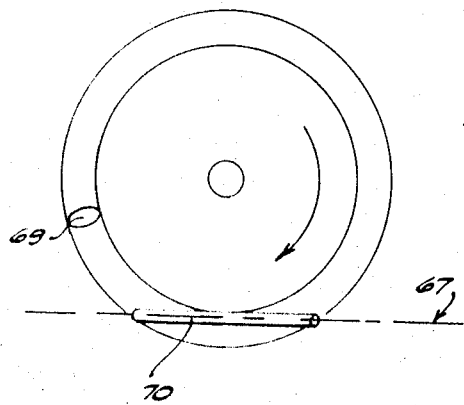
FIG. 4 is a diagrammatic representation of the face of the originally heavier end of the rotor of FIG. 3 illustrating the chordal trace of the path of the deflected beam in the plane of the face upon which the reflected laser beam impinges and also illustrating the resulting elongated spot of volatized material when the beam and rotating element are moved in synchronism.

Refer to FIG. 4. An elongated spot of material 69 including the area from the point of imbalance a radially outward to the periphery of rotor 68 at the angular locus of point a is volatized by the action of the reflected laser beam from source 60. This is due to the fact that the rotor 68 and the path 67 of the deflected beam intercept along a line which moves from the periphery of rotor 68 at the first point of interception of the beam by the rotor 68 face radially inward toward the center of the rotor 68 to the area a and then radially back out again as indicated by the projection 70 of the path of interception of the ray traversing path 67 upon the face of rotor 68. The source of laser emission 60 is then caused to fire continuously as long as imbalance a is indicated by a sensor (not shown) to remain on the face of the rotor 68. As shown in FIG. 2, however, the elongated burned out portion 69 is provided in operation because the material is gouged out or removed radially inwardly from the rotor 68 perimeter.

Optionally, source 60 need not be a continuously emitting source of laser beam energy in operation but may be an intermittent emitting source which is fired as required during adjustment and then is intermittently pulsed or fired until imbalance is removed.

It will readily be apparent, that in the embodiment of FIGS. 3 and 4, rather than providing a separate flat mirror 62, the frustum of the cone 63 may be made flat by machining or otherwise milling and polishing a flat across the surface between the two bases of the frustum of the cone 63. The element 63 may, for example, optionally be made solid or hollow in the fashion of a lampshade construction wherein a sleeve or washer to bearingly receive the output shaft of motor 64 is separated from the outer frame by struts or other separators.

The flat mirror portion 62 is required because a conical mirror shape would merely cause dispersion of the laser beam from source 60 in rotating. With a frusto-conical surface deflector insufficient energy would impinge on rotor 68 from the conical portion to cause appreciable burnout. By providing the flat portion 62, once each revolution, the laser beam provides a concentrated beam of energy directed against the area between the point of imbalance a and radially outward toward the nearest adjacent peripheral point of the face of rotor 68 as illustrated by the arc path of impingement 67 upon the surface of rotor 68 and its projection thereon as shown in FIG. 2 at projection 70 and gouged out area 69.

Figure 5:
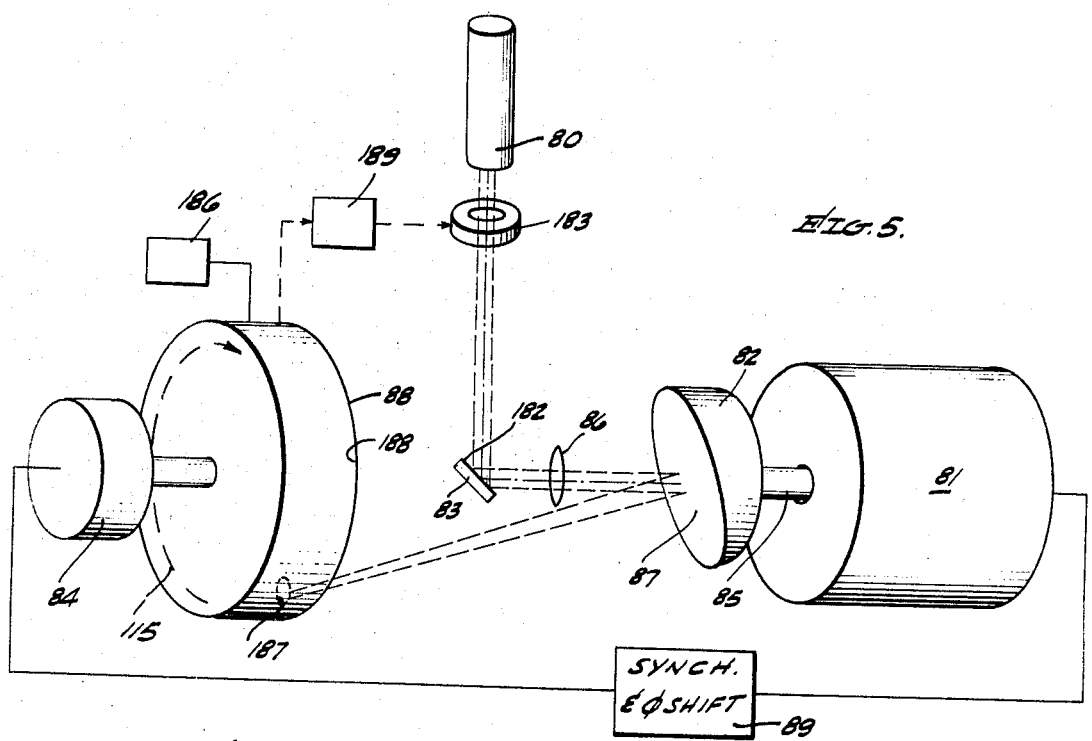
FIG. 5 is a simplified diagrammatic and partially schematic representation illustrating the configuration of certain essential elements of a fourth preferred embodiment of the present invention showing a laser beam energy source, a rotating focusing wobble mirror, and a rotor to be balanced, the rate of rotation of the wobble mirror and the rotor being synchronized, the heavier end of the rotor being positioned nearest the mirror and the mirror being positioned to rotationally deflect and concentrate the energy to impinge upon a surface area of the rotor at a portion of unbalance.

Refer to FIG. 5. The FIG. 5 illustrative embodiment is advantageous in applications, for example, wherein training of the beam or continued concentration of power within predetermined or determinable boundaries of imbalance may be desirable or wherein removal of an unnecessarily elongated or extraneous section of material or an unnecessarily large gouged appearance may be desired to be minimized or eliminated. A rotor 88 from which the unbalance is to be removed, and which is to be balanced may be, for example, a gyroscope rotor. A motor 84 may be provided to rotate rotor 88. A mirror drive motor 81 having an output shaft 85 may be provided and axially aligned with the axis of rotation of the face of gyroscope 88 upon which a point of imbalance appears. A source of laser beam energy 80 may be provided. Source 80 may be a unit similar to respective units 30, 50 or 60 of FIGS. 1, 2 and 3. A nutating wobble mirror 82 may be provided and mounted by suitable means (not shown) upon shaft 85 so as to rotate therewith. The outer peripheral surface of the wobble mirror 82 may be concentric with the shaft 85 and its face (not numbered) which faces an opposing face of the motor 81 may be flat and perpendicular to the shaft 85 axis of motor 84. The opposite reflecting face 87 of the wobble mirror 82 may be flat and cut to form in an angularly inclined plane surface with respect to the plane of the adjacent face (not numbered) of the rotor 88. In order to focus the incoming beam of energy from source 80 at a desired locus on the rotor 88 face, a focusing lens 86 which may be a double convex focusing lens, for example, may be provided. Alternatively the reflecting face of wobble mirror 82 may be suitably curved to focus or concentrate the laser beam from source 80 at a desired locus on the rotor 88 face. A normally stationary mirror 83 may be provided and may be supported by means (not shown) to be positioned with its center aligned with the axis of the shaft 85. Mirror 83 may be disposed in angular relationship for example 45 degrees with respect to the axis of the lens 86 and shaft 85. Mirror 83 and lens 86 are oriented and positioned at distances from laser beam emitting source 80 and wobbling mirror 82 such that light rays striking the reflecting surface 182 of mirror 83 are transmitted through focusing lens 86 to impinge upon the mirror reflecting face 87 of the wobble mirror 82.

Speed synchronizer and phase shifter 89 is provided to vary the speed and phase relationship until substantially exactly synchronizing occurs of the rate of rotation and phase of the motor 81 and hence of the wobble mirror 82 and of the rotor 88. Speed synchronizer and phase shifter 89 may comprise means to vary the phase and angularly rotating speed of either mirror motor 81 or rotor motor 84 or both. Rotor 88 may be imbalanced due to a point of imbalance 187 at which the rotor 88 has more than the mass required to provide balance. That is, balance of rotor 88 may be improvable or restorable upon removal of a determinable amount of material from point of imbalance 187.

In operation, while the source 80 emits a laser beam which is reflected from mirror surface 182 of mirror 83 and focused by the lens 86 onto the face 87 of the wobble mirror 82, the wobble mirror 82 is rotated with rotation of the shaft 85 which is driven by motor 84. From the wobble mirror 82 the laser beam is constantly deflected to traverse the path 115 shown arrowed on the face of rotor 88. Adjustment means 186 may be provided to adjust the distance between the face 188 (opposite face 87 of mirror 82) of the heavier section of the rotor 88 and the face 87 of the mirror 82. The particular adjustment means 186 may be conventional and for example, may be adjustment screw means such as those employed with a lathe or milling machine bed to axially move a support or platform (not shown) of rotor 88. The platform (not shown) may be, for example, similar to platform 21 or platform 45 of FIGS. 1 or 2. The spatial relationship or distance between faces 87 and 188 is adjusted such that the beam from face 87 of mirror 82 is deflected to fall upon the face 188 of rotor 88 in a circle, the radius of which is the radial distance from the center of rotor 88 to the point of imbalance 187. Alternately the radius of deflection can be adjusted by means of a device shown in FIG. 6. Additionally, the rotor 88 and the wobble mirror 82, by adjusting synchronizer and phase shifter 89, are synchronized in phase and in their relative rates of rotation such that the projection of the laser beam constantly impinges upon the point of imbalance 187 in traversing the path 115, the path of travel of the point of imbalance 187 with rotation of the rotor 88. A transducer 189 or other suitable sensing means and a shutter 183 responsive thereto or other suitable beam blocking, switching or other suitable means may be provided such that when the imbalance of the rotor 88 is removed, the firing of the laser beam from source 80 to impinge upon the now removed point of imbalance 187 upon the surface of rotor 88 may be stopped. Transducer means 189 may be similar to the transducer 23 of the FIG. 1 embodiment, the means 183 may be conventional camera shutter circuitry and means or may be a conventional electronic switch to switch off circuits of emitter 80 required for beam emission and the linkage schematically shown by the dashed lines may be any of various conventional mechanical and/or electronic linkage means.

It will be understood, of course, that as illustrated in aforementioned U. S. Pat. 2,346,975 or in Laser Focus, June 1968, page 3, optionally in the embodiments such as those of FIGS. 3 and 5, the point of imbalance if it is on the outer circumferential surface of the rotor rather than on the face may also be removed by the means shown. However, in such cases an additional mirror or plurality of rotating mirrors or a concave mirror larger than the rotor and impinged upon to converge upon the surface may be required or, the firing of the laser beam may have to be discontinuous and to occur only when the point of imbalance on the outer surface of the rotor passes respectively through the path of the beam of the wobble mirror or from the flat mirror.

It is thus shown, that the embodiment of FIG. 5 enables removal of material at the exact point of imbalance to provide a balanced rotor with a minimum of or elimination of unnecessary gouging out of material. It will further be apparent that the exact embodiment illustrated is nowise to be considered limiting and many variations of the FIG. 5 embodiment are also within skill of the art. For example, it will be readily appreciated that the functions of the deflecting mirror 83 and the focusing lens 86 may be combined by providing a mirror having a face of suitable curvature.

Refer to FIG. 6. A practical embodiment of a mirror and holder unit 90 is provided. Mirror and holder unit 90 is adapted to be mounted upon the output shafts of each of mirror motors 31, 51, and 81 of the respective FIGS. 1, 2 and 5 embodiments, for example, and to perform the function of, for example, the wobbling mirrors 32, 52, and 82. Unit 90 may be made of metal or other elastic material, for example, and may comprise a solid cylindrical section 91 and a cup 92. Section 91 and cup 92 are separated by two elongated slots 94 which extend normal to and around most of the periphery of the unit 90 between cup 92 and cylinder 91. Each slot terminates at each end in an enlarged aperture portion 97. At each of two opposed portions on the circumference is thus formed a pair of adjacent rounded enlarged aperture portions 97 which are separated by a thin web 93. Two threaded apertures 95 may be drilled and tapped in cylindrical section 91. Means may be provided which may be threadedly engaged in one or more of apertures 95 to enable finely adjustable bending of the joining web 93 between the aperture portions 97 to angularly dispose the axis of the mirror holding cup 92 with respect to the longitudinal axis of the cylindrical section 91. Said means may comprise a screw driven flexible cable 210 terminating in a plunger 211 and located in the bore 212 of the hollow shaft motor 213. A spring 214 and set screw spring adjustment means 220 may be provided and seated in one of the apertures 95. A counterbore 96 which has a bottoming surface 198 is machined or otherwise formed to extend through the front face of the cup 92. The angular displacement of the mirror holding cup 92 and hence of counterbore 96 is provided by compressing the spring 214 via the cup 92, the plunger 211, the flexible cable 210 and the screw and lever arrangement 215. A mirror 99 having a front face coating 98 may be seated within counterbore 96. The angle of reflection of a beam impinging upon this mirror surface coating 98 is determined by the angle of compression of the slot 94 since the cylindrical section 91 and cup 92 are bent with respect to one another along this slot 94. This bending of the material between enlarged slot ends 97 may be controlled by the above described flexible cable mechanism which is installed in threaded apertures 95. Through the cylinder 91 around its central longitudinal axis is drilled, or otherwise formed, a central aperture 197 sized such that the end of the output shaft of a motor such as the hollow shaft 85 of motor 81 of FIG. 5 is retained therein. Thus, the FIG. 5 embodiment may be employed to perform the function of the mirror unit 82 shown in FIG. 5. In such case the reflection from the source 80 upon being reflected from the wobbling mirror 82 impinges on the offset angular flat mirror portion 99 disposed on the bottom 198 of counterbore 96 to thereby provide wobble mirror action upon rotation of shaft 85 to which mirror and mirror holder 90 is secured.

The cable 210 and screw adjustment 215 permit cocking of the cup 92 by tightening and loosening the screw adjustment 215 to cause a desired angular relationship of the mirror 99, which rests upon the bottoming surface of the counterbore 96 in cup 92, with relation to the motor shaft 85 axis. By directing a collimated source of light onto the mirror 99 and reflecting from the mirror 99 outwardly, a circular trace of light of desired diameter may be obtained depending upon how much the wobbling mirror holder 90 is bent off axis. In that manner, the radius of the circular trace such as trace 115 of FIG. 5, of the laser beam impinging upon the face of a rotor, such as rotor 88, can be determined so as to provide reflection at the exact distance from the center at which the point of imbalance 187 appears.

Figure 7:
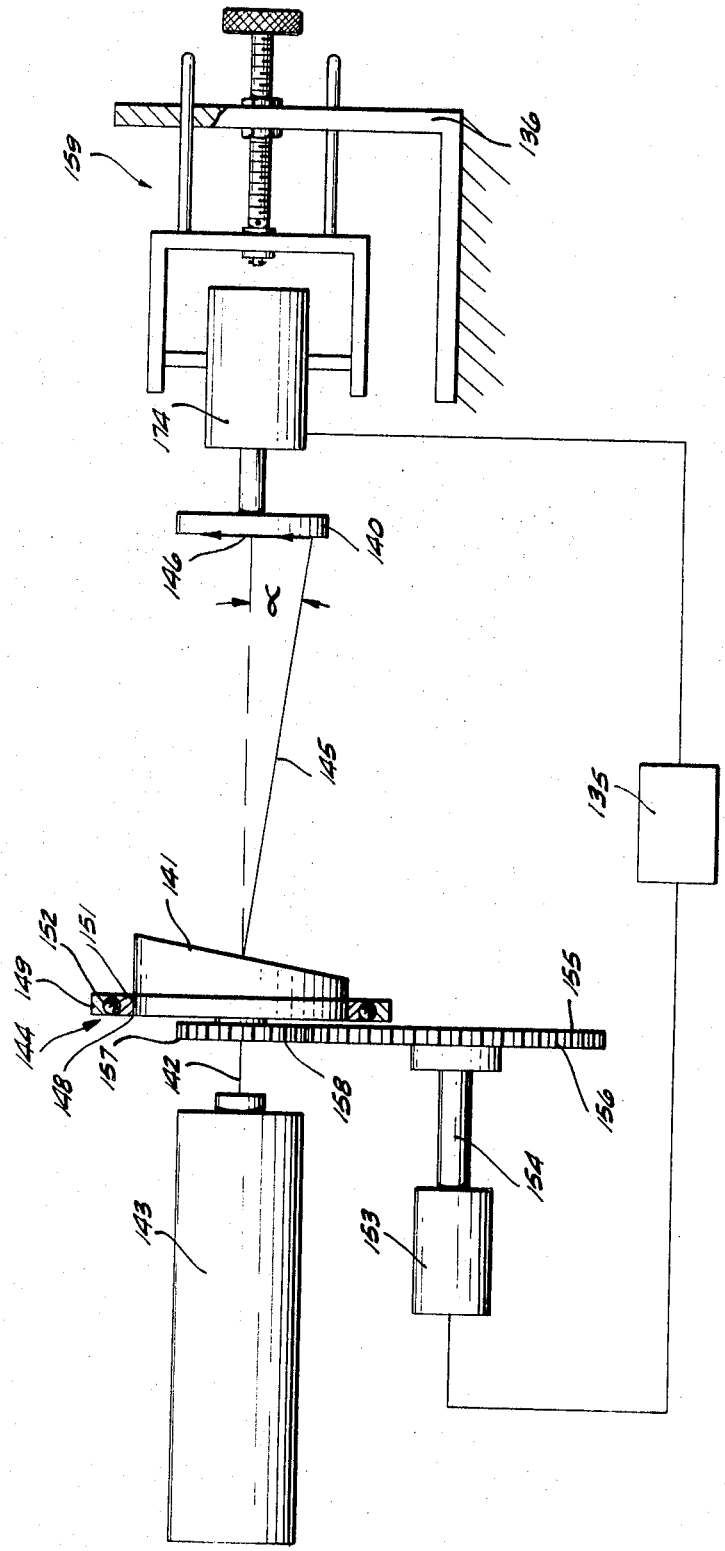
FIG. 7 is a schematic and diagrammatic representation of a fifth preferred embodiment of the invention employing a laser beam energy source and a transparent rotatable wedge-shaped lens to deflect the beam in a circular path to impinge upon a point on the surface of a rotor from which the removal of material causes the rotor to be balanced.

Refer to FIG. 7. A source of laser beam energy 143, a transparent wedge 141, and a peripheral bearing support 144 for wedge 141 are provided to balance a rotor 140 which may be out of balance. Support 144 may comprise an optical wedge holder 148 to clampingly or otherwise securely hold wedge 141, an inner bearing race 151, ball bearings 152, and an outer bearing race 149. The axes of the transparent wedge or wobble lens 141, and of the rotor 140 are aligned with the beam emission or exit port (not numbered) of the source 143 of the laser beam 142. The laser beam 142 emitted from source 143 impinges upon and is deflected by the transparent wedge or wobbling lens 141. Wedge 141 refracts the laser beam 142 to deviate it from center an angle $\alpha$ shown in FIG. 7 as the angle subtended by the emitted beam 142, wedge 141 and rotor 140 common axis and the line 145. Means to rotate wedge 141, for example, a motor 153 having an output shaft 154, and a gear 155 mounted on shaft 154 and having teeth 156; and a ring 157 concentric with the axis of wedge 141, secured to holder 148 and having mating teeth 158 may be provided. Appropriate clearance between the facing side edges of gear 155 and holder 148 will be provided and holder 148 is suitably supported by conventional means (not shown). Rotation of the wedge 141 causes the laser beam 142 to track in a circular path 146 upon the face of the rotor 140. A rotor motor 174 having an output shaft (not numbered) upon which the rotor 140 is mounted may be provided to rotate rotor 140 at the normal operating speed for which it is to be used in an equipment. Optional means of chucking or mounting various types of rotors may alternatively be provided without departing from the spirit and scope of the invention. Adjusting means 159 to adjust the spacing of the face of the heavier side of the rotor 140 disposed towards the laser beam being emitted and the emitting face of the wobbling wedge 141 may be provided. Adjusting means 159 may for example, comprise a motor mount bracket (not numbered), a pair of rotor motor mounting brackets attached guide pins (not numbered), an adjusting screw (not numbered) threadedly engaged in threaded apertures and locked into adjusted position by lock nuts (not numbered) to an angle iron fixed support 136 which may be provided. Adjustment means 159 enables transverse positioning of the motor 174, and the rotor 140 mounted on the motor shaft (not numbered) to a distance of the rotor 140 face upon which beam 145 impinges from the beam 145 exiting face of wobbling wedge 141 such that the radial distance outward from the center of the rotor 140 represented by the circular path 146 is at the radial distance from the center of rotor 140 of the point of imbalance. A variable speed wedge driver motor 153 and a phase shifter 135 may be provided whereby in the manner shown in FIGS. 1 and 2, for example, the rotational speed and phase of the wedge 141 and of the rotor 140 may be synchronized in phase and velocity such that the deflected beam 145 is continuously trained upon the rotor equivalent point of imbalance in traversing the circular coincident path 146 of projection of beam 145 upon the rotor 140 face and rotation of the face projection of the rotor 140 point of imbalance. Similarly to the FIG. 1 device, for example, means similar or identical to sensing means 23, amplifying and computer circuit means 24, rotor and lens strobing means 27, 28 and 29 and phase shifter 37 may be provided such that rotor 140 and lens 141 may be synchronized and put in phase whereby as in the previous embodiments the beam 145 is made to impinge continuously upon the rotor equivalent point of imbalance. In the FIG. 7 embodiment also, means such as switching control means 38 may also be provided and connected in circuit to be responsive to removal of the signal from sensing means 23 such that upon removal of the signal indicating continued imbalance, the source of laser emission 143 responsive thereto is automatically turned off. The strobes (not shown) may be respectively directed against the wedge 141 and rotor 140 and the sensing and circuit means (not shown) connected as in the FIG. 1 or 2 embodiments.

Refer to FIGS. 8 through 12 inclusive. This series of figs. illustrates the means and method of another embodiment of the present invention in the style of a motion picture representation of sequential operations.

Figure 8:
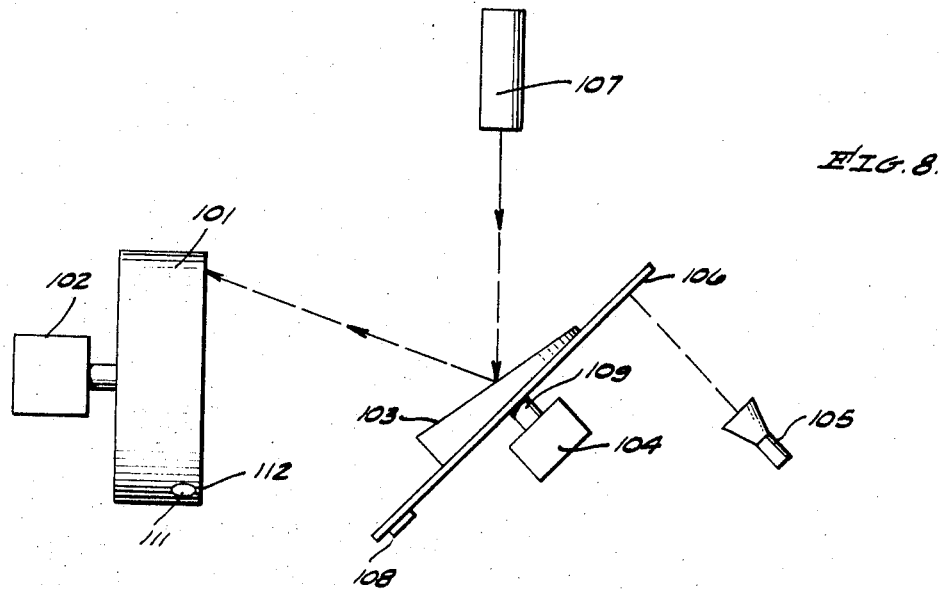
FIGS. 8 through 12 are simplified diagrammatic and partially block and schematic representations of still another preferred embodiment of the invention similar to the wobble mirror embodiment of FIG. 1 showing a laser beam energy source, a wobble mirror and support having a synchronizing marker, a strobe light, and a rotor and motor drive therefor, to sequentially illustrate in a moving picture display.

Refer to FIG. 8. A rotor 101 is to be balanced. A rotor driver motor 102 to drive the rotor 101, a wedge-shaped circular planar or concave mirror 103, and a synchronizing mirror support 106 which may be disk-shaped and on which the rear surface of the mirror 103 rests, are provided. A mirror driver motor 104 having an output shaft 109 is provided. Mirror 103 may be mounted concentric with the axis of shaft 109 wherein the mirror 103 and shaft 109 axes coincide. A source of laser beam emission 107 is provided and it and rotor 101 may be positioned such that the laser beam therefrom strikes the center of the mirror 103 and is reflected therefrom to hit an opposing face of rotor 101. By conventional means (not shown), for example, those described in the description of FIG. 6, adjustment of the angle of the face of mirror 103 is made such that the deflected beam of laser energy from source 107 impinges upon the face of the rotor 101 at the radially outward point determined by the projection 112 upon the rotor face of the actual point of imbalance 111. The synchronizing support disk 106 and hence the mirror 103 is rotated by mirror motor 104. The rotor 101 is rotated by the rotor motor 102. A synchronizing marker 108 may be positioned on the support 106 of the mirror 103. The synchronizing marker 108 is disposed adjacent to the edge of the synchronizing disk 106 of the disk face opposite the disk face which supports mirror 103. A stroboscopic light 105 is provided. Stroboscopic light 105 is positioned such that the rays emitted therefrom strike at the same distance from the axis of the synchronizing disc 106 as that of the synchronizing marker 108. Means (not shown in FIGS. 8–13) similar to the means of FIGS. 1 and 2 are provided for the apparatus of FIGS. 8–13 to adjust synchronism and phase of the rotating elements, to sense imbalance of rotor 101 and to accordingly cause the stroboscopic light 105 to flash.

Assume the rotor 101 and wobbling mirror 103 are rotatingly driven by respective driver motors 102 and 104. Source 107, if emitting a beam of laser energy would cause the beam to impinge upon the face of mirror 103 and strike at the locus of the wobbling mirror 103 axis. Rotor 101 is positioned with respect to mirror 103 such that if present the beam would be deflected in a circular path the projection of which upon the rotor 101 face is a circle wherein the circle radius is equal to the radial distance from the rotor axis of the surface representation 112 of the point of imbalance.

In the representation of FIG. 8 the rotor 101 and the beam deflecting wobbling mirror 103 are not in correct phase relationship such that a laser beam from source 107 would remove the point of imbalance 111. If the laser beam from laser source 107 were fired at this instant, as shown by the dashed lines, the laser beam would impinge upon the wrong spot on the rotor 101 and aggravate the imbalance.

Figure 9:
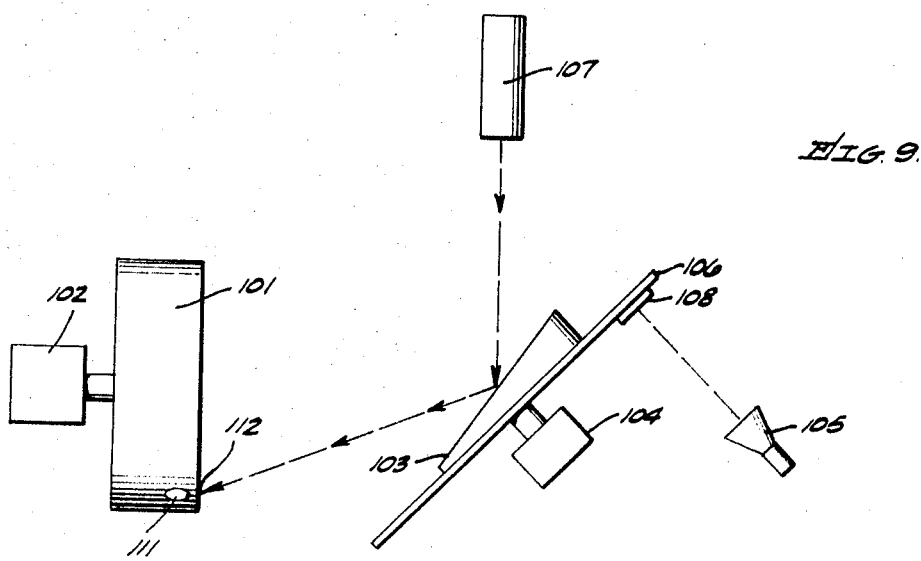

Refer to FIG. 9. In FIG. 9 the instantaneous angular relationship between the rotor 101 and the mirror 103 is now adjusted and is such that the stroboscopic or illuminating device 105 is illuminating the mirror marker 108. In this condition, the laser source 107 if fired would cause the beam (not numbered) shown in dotted lines to strike the point of imbalance 109 of the rotor 101

Figure 10:
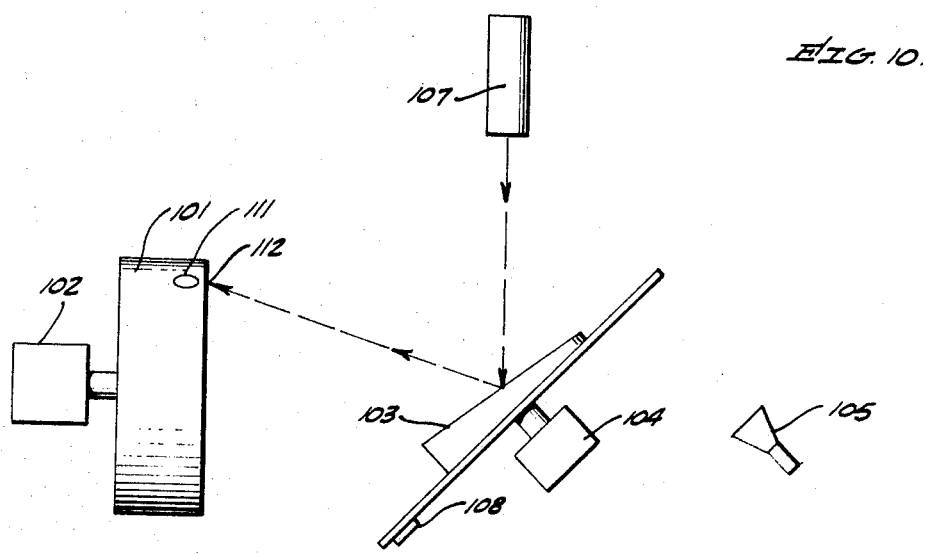

Refer to FIG. 10. In FIG. 10 it is illustrated that once the required fixed angular relationship is established between the mirror 103 and the rotor 101 to cause impinging of a beam from source 109 upon imbalance point surface projection 112, if both mirror 103 and rotor 101 are caused to continue to rotate in phase and in synchronism, even when the strobe light is off the illuminating marker 108 or if the strobe light 105 were to be turned off entirely, the laser beam shown by the dashed lines from laser source 107 would still hit the point of imbalance surface projection 112. The condition shown is that of a rotation of the mirror 103 and of the rotor 101, 180 degrees following the position shown in FIG. 9 with the mirror marker 108 on the opposite side from that shown in FIG. 9. Although the light from strobe light 105 does not hit the marker 108, the laser beam from source 107 is still locked in to impinge upon the point of imbalance 112. Thus, once the phase and synchronism relationship of mirror 103 and rotor 101 has been established, even in the instances when the strobe light is off the illuminating marker 108, the laser beam from laser source 107 continues to be locked in with the surface projection 112 of the point of imbalance 111.

Figure 11:
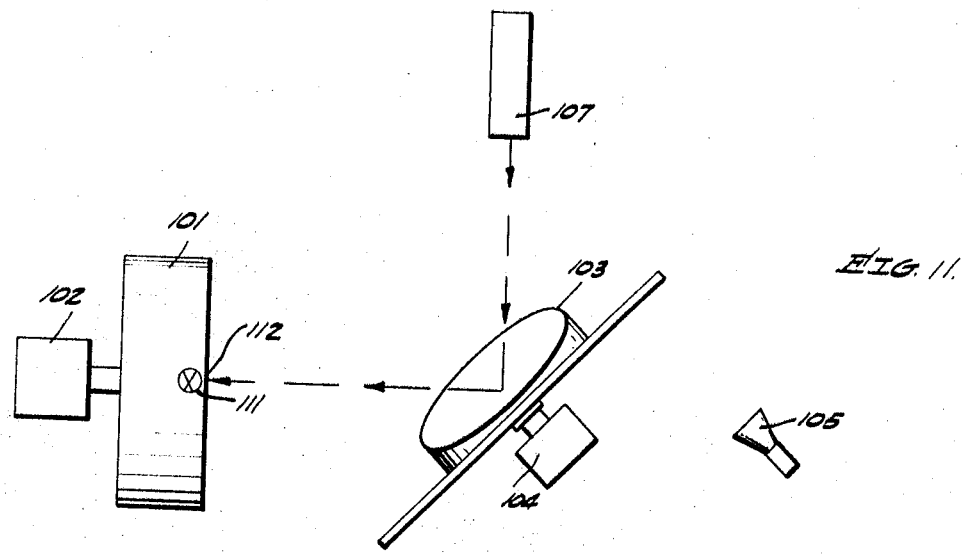

Refer to FIG. 11. The rotor 101 is shown at top dead center (T.D.C.) rotational position of the point of imbalance projection 112. The rotation of the mirror 103 is still locked in phase and synchronous relationship with the rotation of the rotor 101. The point of impingement of the laser beam from source 107 which is reflected from the face of the mirror 103, continues to impinge upon the point of imbalance of the rotor 101.

Figure 12:
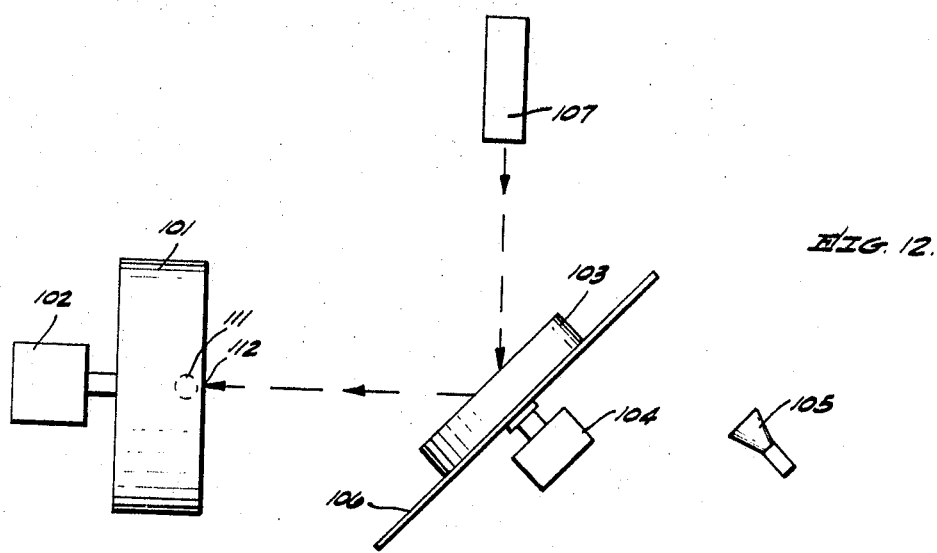

Refer to FIG. 12. The point of imbalance 111 and its projection 112 upon the face of the rotor 101 and the locus of striking upon the face of the rotor 101 by the laser beam from source 107 which is reflected from the mirror 103 are both now at bottom dead center (B.D.C.). Even though the strobe light 105 is off at this instant, the beam is hitting the projection 112 of the point of imbalance 111.

Figure 13:
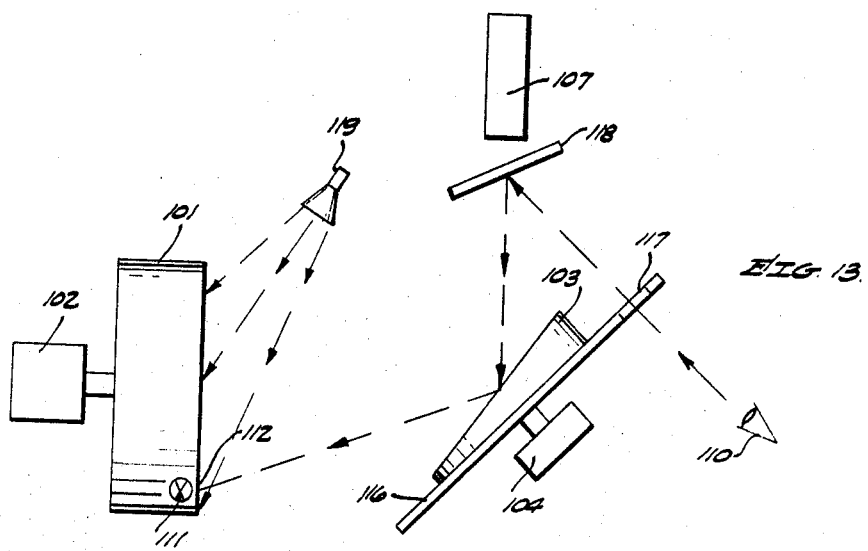
FIG. 13 is a simplified diagrammatic and partially block and schematic representation of still another embodiment presenting a modification of the embodiment of FIGS. 8–12 wherein a shutter element and a modified support are incorporated and enable viewing of the point at which the laser has impinged to permit monitoring of the balancing operation.

Refer to FIG. 13. In this embodiment, identical elements (and so numbered) are provided except that the support is modified by providing an aperture 117 through the mirror support 116, by providing a half transparent mirror 118 and by positioning the strobe light 119 such that it impinges upon the face of the rotor 101. The half transparent mirror 118 is disposed angularly to the axis of the beam emitted from source 107 toward the center of the mirror 103 and is oriented such that the laser beam from source 107 passes through the half transparent mirror 118, strikes the mirror 103 and is reflected onto the face of the rotor 101 at the projection 112 of the point of imbalance 111. The light rays reflected from the surface projection 112 of the point of imbalance illuminated by stroboscopic light 119 are reflected from mirror 103 to the half transparent mirror 118 whence they are reflected back to the viewer shown at 110. This enables the viewer at 110 to view the point where the laser has impinged or will be impinging through the aperture 117. A slit could be provided in place of the aperture 117 if desired. Either of these alternate embodiments would provide visual aid helpful in monitoring the balancing operation.

It will be understood, of course, that in the embodiments shown in FIG. 13, also means to provide synchronism and locked in phase relationship between the rotation of the rotor 101 and the rotation of the wobbling mirror 103 would be provided for example, by synchronizing and phase shifting means (not shown) disposed between the motors 102 and 104.

While salient features have been illustrated and described with respect to particular embodiments, it should be apparent that modifications may be made readily within the spirit and scope of the invention. It is therefore not desired to limit the invention to the exact details shown and described. For example, in the FIG. 3 embodiment, optionally, a section of the cone 63 can be flatened to provide the function of flat mirror 62 or alternatively a flat plane surface not necessarily of the trapezoidal shape of mirror 62 could be attached along a longitudinal axis tangential to the conical surface 63. Obviously, alternative ways of phase shifting and alternative types of motors, mounting means, and optical and electrical parts might be employed. As pointed out hereinabove, variations in lateral, rotational and vertical positioning of the rotor, laser beam emitter, and mirrors or optical units may be interchanged so as to arrive at the correct spacial and orientation parameters required for balancing. Many optional mechanical, electrical, and other variations of the means for adjustment and of these elements are possible without departing from the spirit and scope of the invention. For example, instead of utilizing a wobbling mirror or a flattened conical mirror, various types of wobbling lens, wobbling thick glass plates and electro-optical beam deflectors may be provided additionally to those shown and can satisfy the criteria of capability of synchronous and in phase movement with the rotation of the rotor to assure zero relative motion between the beam deflecting means and the rotor so that the beam may constantly impinge upon the rotor.

There thereby has been shown a means for balancing a rotating element by moving a material removing means in phase and synchronism with the rotating component, permitting the separate control of energy from the removing means and wherein is obviated the need for critical control of the firing for removal time of the means utilized. The necessity for irregular gouges resulting from dynamic balancing is also eliminated or minimized by the inventive optical scanning device. Capability of the invention has been shown of rotationally displacing a focused laser beam in synchronism with the rotation of the rotary element to be balanced in such manner that the laser beam will always impinge on the same selected spot on the periphery or sides of the rotor while the imbalance remains and wherein the angular location of imbalance on a rotating element may be sensed, the phase relationship between a scanner head and the rotor may be coincided, the firing of the laser beam may then be made continuous and these steps can be carried out without stopping the rotating element, without time consuming extra manipulations, so as to enable removal of material by a laser pulse, wherein the duration of the pulse will have no effect on the size or shape of the volatized area and in a manner permitting accurate removal of imbalance.

What is claimed is:

1. Apparatus to dynamically balance a rotary body comprising:
  a. means to rotate the rotary body,
  b. a source of a beam of energy capable of rendering material of said body removable,
  c. means to deflect said beam of energy in a path terminated by impingement upon a selected portion of the surface of the rotary body,
  d. means to effect motion of the path of said deflected beam, and
  e. means to control said motion of the path and said means to rotate said rotary body to effect substantially synchronous and in phase movement of said beam path impingement and said selected portion.

2. The apparatus of claim 1 wherein:
  a. said means to rotate the body further comprises means to rotate the body at normal operating speed,
  b. said source and said means to deflect said beam further comprises means to supply concentrated laser beam energy to said rotary body, and
  c. said means to effect motion of the path further comprises means to deflect said beam into a rotating path wherein the beam impinges upon the area comprising said selected portion of the rotary body surface.

3. The apparatus of claim 1 wherein said selected portion of the surface is a portion of equivalent imbalance, said control means further comprising:
  a. means to sense imbalance of said rotary body, and
  b. means responsive to said sensing means to retain the apparatus in enabled condition such that the beam continues to impinge upon said selected surface until sufficient energy has been delivered to remove the equivalent imbalance of the rotary body.

4. The apparatus of claim 1:
  a. said means to deflect further comprising an optical scanner having a beam deflecting face angularly disposed with respect to the plane normal to said rotary body axis,
  b. means to support and rotate said optical scanner, and
  c. means to adjust the relationship between said scanner and said rotary body such that the beam deflected by said scanner is deflected to impinge radially outwardly from the axis of said rotary body a distance substantially equal to the distance that the selected portion is disposed radially outwardly from the axis of said rotary body.

5. The apparatus of claim 4:
  a. said supporting and rotating means further comprising means to support and rotate said optical scanner about an axis axially aligned with the axis of said rotary body such that said optical scanner is caused to wobble while rotating and to deflect said beam in a circularly scanning trace upon the rotary body surface.

6. The apparatus of claim 1 wherein:
   a. said means to deflect comprises a frusto-conical support having a flat reflecting mirror disposed upon a portion of the frusto-conical periphery, and
   b. means to adjust the distance between said rotary body and said mirror to cause the beam from said source to impinge at a distance radially outward from the axis of said rotary body varying between the radially outward distance at which the selected portion of the rotary body appears and the rotary body periphery.

7. The apparatus of claim 1, wherein:
   a. said selected portion is an equivalent area of imbalance,
   b. said means to deflect said beam further comprises an optical scanner having an indicator,
   c. said means to rotate further comprises a rotary body drive motor,
   d. said means to control further comprises:
      1. an optical scanner drive motor,
      2. transducer means to sense the area of rotary body imbalance at a particular angular position in the rotation of the rotary body,
      3. a stroboscopic light connected to be responsive to said transducer to illuminate said optical scanner indicator when the area of imbalance passes said transducer coincident with the indicator passing said stroboscopic light,
      4. said indicator being positioned on said scanner such that a beam of energy impinging upon said scanner will strike said area of imbalance of said rotary device when said stroboscopic light illuminates said indicator,
      5. means to adjust the phase and synchronism of at least one of said scanner and mirror drive motors with relation to the other of said scanner and mirror drive motors until the beam is continuously aimed in a direction to impinge upon the proximity of said equivalent area of imbalance of said rotor to remove material over a time duration sufficient to remove imbalance.

8. The apparatus of claim 7, wherein:
   a. said source further comprises a source of laser beam energy capable when concentrated for a substantial time duration of boiling off of material where striking said rotary body, said apparatus further including:
   b. means connected to and actuated by the output of said transducer to cut off said beam when sufficient material has been removed from said rotary body to remove the equivalent imbalance, and
   c. means to concentrate said laser beam energy such that said deflected beam is concentrated upon said equivalent imbalance area of said rotary body.

9. Apparatus to dynamically balance a rotary body comprising:
   a. a first drive means to rotate said rotary body,
   b. a rotatable optical deflection means positioned to deflect a beam of energy upon said rotary body,
   c. a second drive means to rotate said optical deflection means,
   d. a source of laser beam energy directed to be deflected by said optical deflection means,
   e. means associated with said deflection means to concentrate said laser beam energy,
   f. means to adjust said deflection means to selectively aim said beam to concentrate upon an equivalent area of imbalance on the surface of said rotary body,
   g. means to adjust the relative phase and speed of said motors to provide in phase and in synchronism continuous aiming of said beam upon the proximity of said equivalent area of imbalance while said rotary body and rotatable optical deflection means are rotating.

10. The apparatus of claim 9 wherein said means to adjust said deflection means further comprises:
   a. an indicator associated with said optical deflection means,
   b. imbalance sensing means to sense imbalance of said rotary body,
   c. stroboscopic means responsive to said sensing means to strobe said optical deflection means,
   d. said indicator being positioned to be illuminated by said stroboscopic means when said deflection means is in phase and in synchronism with said rotary body such that a beam from said source incident on the optical deflection means strikes the proximity of said equivalent area of imbalance.

11. The apparatus of claim 10 including:
   a. means responsive to termination of signal output from said sensor to terminate the application of further energy from said source to said rotary body.

12. The apparatus of claim 9 wherein said deflection means and said means to adjust said deflection means further comprise:
   a. a wobble mirror having a deflecting face,
   b. a rotatable support for said mirror, and
   c. means to adjust the angle of said reflecting face with respect to the axis of rotation of said mirror to enable said selective aiming of said beam.

13. The apparatus of claim 9 wherein said deflection means and said means to adjust said deflection means further comprise:
   a. an optical transparent wedge aligned with said rotary body and positioned to intercept the laser beam from said source and to deflect said beam angularly with respect to the axis of said rotary body, and
   b. means to adjust the distance of said rotary body from said optical transparent wedge such that the radius of trace of said beam upon said rotary body is substantially the radial distance of the equivalent area of imbalance of said rotary body.

14. The apparatus of claim 9, said means to concentrate said laser beam further comprising:
   a. a focusing lens positioned in the path from said source to said deflection means.

15. The apparatus of claim 14 including:
   a. a mirror to reflect laser beam energy disposed between said source and said lens.

16. The apparatus of claim 9, said means to concentrate said laser beam further comprising:
   a. a concave deflecting face on said optical deflection means curved to concentrate said laser beam upon said rotary body.

17. The apparatus of claim 16 including:
   a. a mirror to reflect laser beam energy disposed between said source and said concave deflecting face.

18. The apparatus of claim 9 wherein:
   a. said first and second drive means are synchronous drive means,
   b. said means to adjust the relative phase and speed of said synchronous drive means further comprises:
      1. an A.C. supply source,
      2. a phase shifter to adjust the phase of the input to said synchronous drive means,
      3. an imbalance sensor responsive to rotation thereby of a rotary body equivalent area of imbalance of said rotary body,
      4. a rotor strobe unit,
      5. a mirror strobe unit electrically parallel to said rotor strobe unit,
      6. a phase compensator network responsive to the signal output of said imbalance sensor to activate said mirror and rotor strobe units.

19. The apparatus of claim 9 including:
   a. an optical deflection means holder,
   b. an indicator disposed on said holder,
   c. imbalance sensing means to sense imbalance of said rotary body,
   d. stroboscopic means responsive to said sensing means, e. said indicator and said stroboscopic means being relatively positioned such that when said stroboscopic means is activated by said imbalance means and illuminates said indicator each revolution of said motor and optical deflection means holder, said motor and optical deflection means are rotating in phase and in synchronism and the beam is aimed to follow the movement of the equivalent area of imbalance.

20. The apparatus of claim 19 including:
   a. a partially transparent and partially reflective means disposed in the beam path between said source of said deflection means,
   b. said holder being apertured for viewing therethrough,
   c. said partially transparent and partially reflective means being positioned to reflect an image of the area of imbalance through said aperture and to pass a laser beam therethrough from said source to said deflecting means.

21. Apparatus to physically change the structure of a body to adapt the body to move accurately in a predetermined desired operating pattern comprising:
   a. means capable when said structure of said body is appropriately changed to move the body in said desired operating pattern,
   b. means to transmit a beam of energy which is capable of deforming said body in a path,
   c. means to change the direction of said beam path to approximately follow an area of said moving body for a duration of impingement of said beam to deform said body to said physical change.

22. The apparatus of claim 21 wherein said means to change said beam path further includes:
   a. means to change said beam path such that a trace of said path at least periodically impinges upon said area, and
   b. means to adjust the relative moving of said body in said operative pattern and the changing of the direction of said beam path to moving of the body and following of the path in phase and in synchronism.

23. The apparatus of claim 22 including:
   a. transducer means to sense the need for additional change in said structure to enable said body to move in said desired pattern, and
   b. means responsive to said transducer means to provide indication of adjustment to said in phase and in synchronism relationship of the said beam path direction changing and said body moving.

24. A method of providing a predetermined physical characteristic to a body comprising:
   a. moving the body in a desired movement pattern,
   b. transmitting a beam of energy capable of effecting body deformation,
   c. moving the path of said beam synchronously with said body moving to enable impingement of the beam while transmitting and synchronously moving upon approximately a predetermined area of said body to be deformed,
   d. sensing lack of said predetermined physical characteristic periodically while in said moving pattern,
   e. at least periodically actuating said transmitting of said beam of energy until body deformation occurs to substantial attainment of said predetermined characteristic at said predetermined area.

25. A method of dynamically balancing a rotary body comprising the steps of:
   a. rotating the body,
   b. locating an equivalent point of imbalance on the surface of said body,
   c. transmitting a beam of energy capable of removing material from said body,
   d. moving the direction of said beam in synchronism with said body rotating so as to effect impingement of said energy beam at successive loci of the appropriate area of said imbalance point while said equivalent imbalance point remains.

26. The method of claim 25 including the steps of:
   a. sensing the equivalent point of imbalance at successively occurring intervals,
   b. continuing to direct the said path of impingement upon said approximate area while indication of imbalance at said equivalent point of imbalance continues.

* * * * *